US005512120A

United States Patent [19]

Hinton et al.

[11] Patent Number: 5,512,120

[45] Date of Patent: Apr. 30, 1996

[54] APPARATUS AND METHOD FOR APPLYING A LABEL TO A CONTAINER

[75] Inventors: Gaylen R. Hinton, Merced; Stanley B. Black, Modesto, both of Calif.

[73] Assignee: Trine Manufacturing Company, Inc., Turlock, Calif.

[21] Appl. No.: 269,512

[22] Filed: Jul. 1, 1994

Related U.S. Application Data

[63] Continuation of Ser. No. 29,511, Mar. 11, 1993, abandoned.

[51] Int. Cl.[6] .................... B32B 31/00

[52] U.S. Cl. .................... 156/215; 156/86; 156/285; 156/444; 156/448

[58] Field of Search .................... 156/84, 85, 86, 156/215, 285, 443, 444, 446, 448

[56] References Cited

U.S. PATENT DOCUMENTS 4,406,721 9/1983 Hoffmann .
4,544,431 10/1985 King .
4,566,933 1/1986 Crankshaw et al. .
4,595,449 6/1986 Nowicki .
4,844,760 7/1989 Dickey .
4,872,931 10/1989 Mitchell .
4,923,557 5/1990 Dickey .

*Primary Examiner*—David A. Simmons
*Assistant Examiner*—Paul M. Rivard
*Attorney, Agent, or Firm*—Lothrop & West

[57] ABSTRACT

An apparatus and method for applying a heat shrinkable film to a container having a right-circular, cylindrical sidewall section and at least one inwardly directed end section. A film segment is transported by a rotary vacuum drum past an adhesive station, where adhesive is applied to leading and trailing ends of the film. Then, the film is wrapped completely around the container by the co-operative action of a vacuum drum and an arcuate roll-on pad, leaving a free-standing portion of the label extending past the sidewall section. In the overlapping ends of the film, a first seam is formed by compressive forces between the vacuum drum and the container sidewall. A second seam is simultaneously formed by the compressive force of an active label deflector on the vacuum drum, adapted to press the free-standing portion of the label ends against the end section of the container. Heat is then applied to the label, shrinking the free-standing portion upon the container's end section.

13 Claims, 7 Drawing Sheets

APPARATUS AND METHOD FOR APPLYING A LABEL TO A CONTAINER

This application is a continuation of application Ser. No. 08/029,511, filed Mar. 11, 1993 now abandoned.

BACKGROUND OF THE INVENTION

A. Field of the Invention

The invention relates generally to an apparatus and a method, for the effective application of a heat shrinkable film or label, to a container having a right-circular, cylindrical sidewall section, and at least one inwardly directed end section. More specifically, the invention provides a novel solution to the problem of forming an effective adhesive seam between overlapping ends in the free-standing portion of a heat shrinkable film. After formation of the overlap seam, heat is applied to the label, shrinking the free-standing portion over the container's contoured end section to provide a tight and attractive container wrap.

Certain advantages and difficulties associated with the use and application of heat shrinkable film on containers are discussed in U.S. Pat. No. 4,923,557, issued to Dickey, and assigned to the predecessor in interest of the assignee herein. The entirety of U.S. Pat. No. 4,923,557 is specifically incorporated by reference into the instant application. The '557 Patent teaches that compressive forces can advantageously be applied outwardly, against the inner wall of overlapping but unsupported ends of a solvent reactive film or label, to form an effective solvent induced bond or seal therebetween.

Having an extremely low viscosity, the solvent bonding agent used to practice the invention of the '557 Patent spreads rapidly by capillary action between the leading and trailing ends of a label, overlapped during the labeling process. It is critical, however, that these label ends are maintained in contingent relation, during the moment of initial overlap, before the solvent evaporates. The force required to make a positive, solvent induced seal is not great. As long as sufficient pressure is applied at the time of overlap to keep the ends physically together, an effective bond will be formed between the two ends.

Nevertheless, economic considerations may make it desirable to label a container with a film material which is heat shrinkable, but not solvent reactive. Heat shrinkable polypropylene, for example, is less expensive than the solvent-sensitive polyvinylchloride label material. Polyethylene also shows promise as another economical heat shrinkable material, which is not solvent reactive. In addition to cost factors, health or environmental concerns may dictate the absence of solvent in any aspect of particular labeling processes.

In these instances, an adhesive or glue must be applied first on the leading end of the heat shrinkable label to adhere the label to the container, and then on the trailing end of the label, to form an overlapping seam with the leading end. During this application process, the label is usually transported by a rotary vacuum drum or a vacuum conveyor belt, past a glue station. There, a glue applicator element is typically brought into direct contact only with selective portions of the label. Alternatively, a gravure element has been employed to print adhesive only upon the desired areas of the label. The prior art also teaches the application of glue upon a label from an ejection nozzle, spaced from the vacuum drum.

A widely used, conventional adhesive in the labeling art is hot melt adhesive, manufactured from a resinous material, characteristically solidified at room temperature. Hot melt adhesive is applied in a fluid, but significantly viscous condition, generally both to leading and trailing ends of a label segment, before wrap-applying the segment around a container. Other adhesives, such as water-based paste or glue, have similarly been used either alone or in combination with hot melt adhesive, to adhere full wrap or partial wrap labels to containers.

Certain characteristics of these adhesives and glues, particularly those of hot melt adhesive, make their use more difficult in heat shrink label applications: (1) owing to its high viscosity, hot melt adhesive does not readily "wet" the label material and spread under overlapping label ends, as solvent does; (2) a coating or layer of hot melt on a label cools from its exposed surface to its interior portion, with the consequence that the exposed portion of the adhesive initially making contact between label ends, is cooler and less tacky than the interior portion; (3) hot melt applied to a relatively thin, heat shrinkable film causes the film to curl slightly in the immediate area of application, making positive, full contact between the label ends problematical. The known prior art does not address these difficulties in the same manner as that contemplated by the invention disclosed and claimed herein.

B. Description of the Prior Art

U. S. Pat. No. 4,844,760, issued to Dickey, discloses the use of ejection-applied hot melt adhesive and wipe-applied solvent, respectively, upon leading and trailing ends of a solvent reactive label, prior to applying the label to a container.

U.S. Pat. No. 4,923,557, issued to Dickey, teaches the use of compressive force against the inner wall of an unsupported solvent formed label seam, while the outer wall of the film seam is backed by a vacuum drum.

U.S. Pat. No. 4,406,721, granted to Hoffmann, illustrates an extensible-retractable tongue mechanism, to facilitate the formation of an adhesive seam in the label ends compressed between the tongue and a vacuum drum.

U.S. Pat. No. 4,872,931, issued to Mitchell, shows a container gripping chuck mechanism, having an integral lip-extension. A vacuum drum presses against the label seam, backed by the chuck extension, to form an adhesive bond.

U.S. Pat. No. 4,544,431, granted to King, discusses the use of hot melt adhesives and solvent reactive adhesives, in which a timed air blast is used to drive the trailing end of the label against a column coated with glue or solvent.

SUMMARY OF THE INVENTION

The invention herein includes a rotary vacuum drum, especially adapted to form adjacent, serial, first and second compressive seams, along the overlapping ends of a heat shrinkable label applied to a container. The container typically includes a right-circular, cylindrical sidewall section and at least one inwardly directed, or contoured end section. As the label is completely wrapped around the sidewall of the container, the first and second seams are simultaneously formed, leaving a free-standing portion of label extending beyond .the sidewall. This free-standing portion surrounds, but does not touch, the contoured end of the container. Heat is subsequently applied to the label, with the result that the free-standing portion shrinks inwardly and assumes the configuration of the end section of the container.

To accomplish this method of label application, a label segment is first cut from a continuous roll of label stock, and then applied to the outer periphery of the vacuum drum. The vacuum drum and the label are rotated past a glue or adhesive station, where is adhesive is applied to selective portions of the inner face of the leading and trailing ends of the label.

A container is brought into tangential contact with the adhesively coated leading end of the label. The container is then caused to spin about its axis and pass through an arc, through the co-operative action of the rotating vacuum drum and a stationary arcuate roll-on pad, spaced from and concentric with the drum. As the container spins, the label is peeled from the vacuum drum, and successively wrapped completely around the container.

The moment that the trailing end overlaps the leading end, the first adhesive seam is formed by compressive forces between the vacuum drum and the sidewall section of the container. Simultaneously, a label deflecting element on the vacuum drum is actuated, forcing the remaining free-standing portion of the label ends inwardly against the end section of the container. By actuating this driven element in synchronism with the initial overlap of the label ends, a second adhesive seam is compressively formed in the unsupported, or free-standing portion of the label.

The labeled container is subsequently transported to a heating oven, where the free-standing portion of the label is caused to shrink upon the end section of the container.

DETAILED DESCRIPTION OF THE PREFERRED EMBODIMENT

Figure 1:
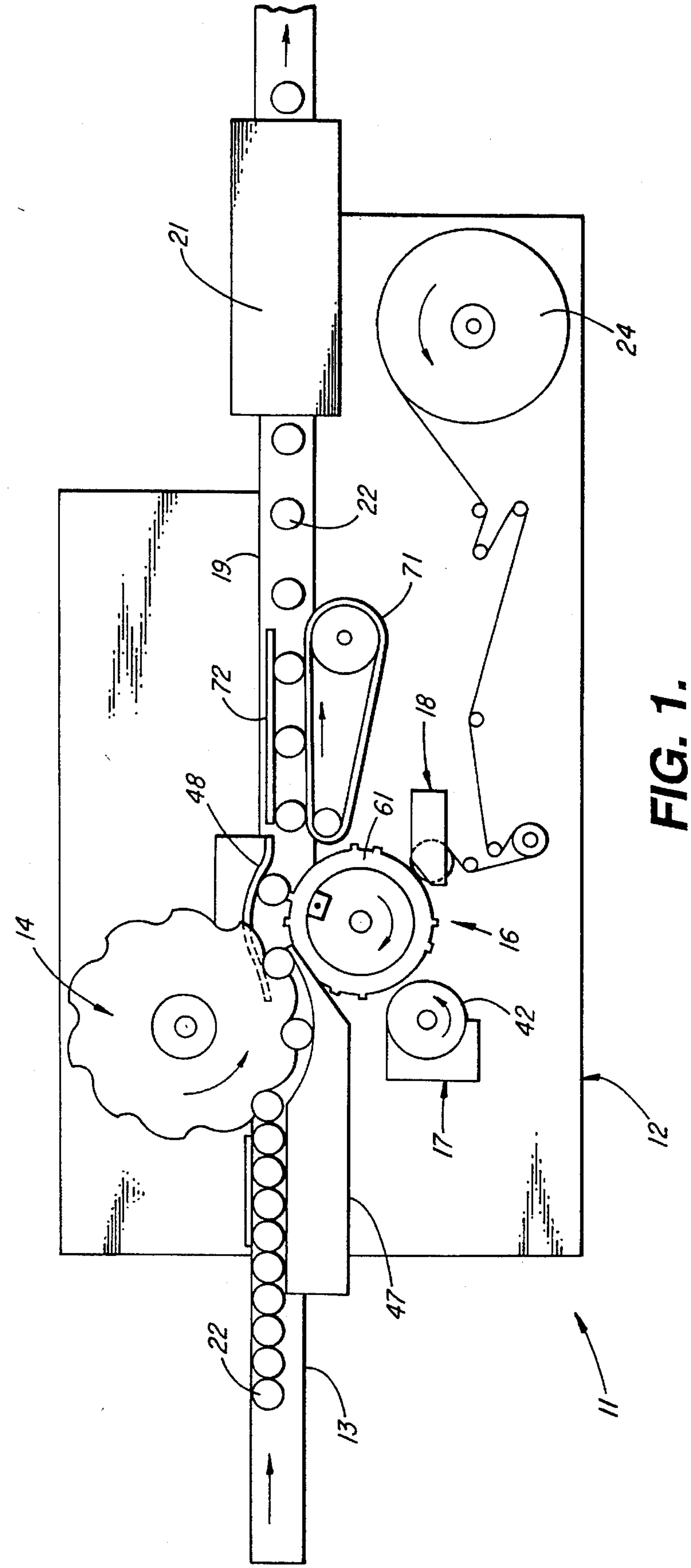
FIG. 1 is a top plan view, generally showing labeling machine embodying the invention herein.

Turning now to FIG. 1, a labeling apparatus 11 embodying the present invention is shown. A frame 12 or table, supports all of the major components of the apparatus, including an infeed conveyor 13, a rotary starwheel 14, a vacuum drum 16, an adhesive station 17, a label cutting station 18, a discharge conveyor 19, and a heat-shrink oven 21. Containers 22 are transported and handled by the conveyor 13 and the starwheel 14 in the conventional way, as described in greater detail in the incorporated U.S. Pat. No. 4,923,557. The '557 Patent also explains with more specificity, how label segments 23 are manufactured from a roll 24 of continuous stock material by label cutting station 18.

As each segment is so manufactured, it is drawn into a predetermined location upon the resilient, rubber outer periphery 26 of vacuum drum 16. As shown most clearly in FIG. 2, a leading end 27 overlies a radially extending leading end pad 28, and a trailing end 29 overlies a radially extending trailing end pad 31. In the embodiment disclosed herein, pads 28 and 31 are located and dimensioned to maintain the respective overlying label ends a predetermined distance away from the periphery 26 of the vacuum drum. It should be noted, however, that other methods of adhesive application, to be discussed more fully below, require no vacuum drum pads whatsoever.

Figure 2:
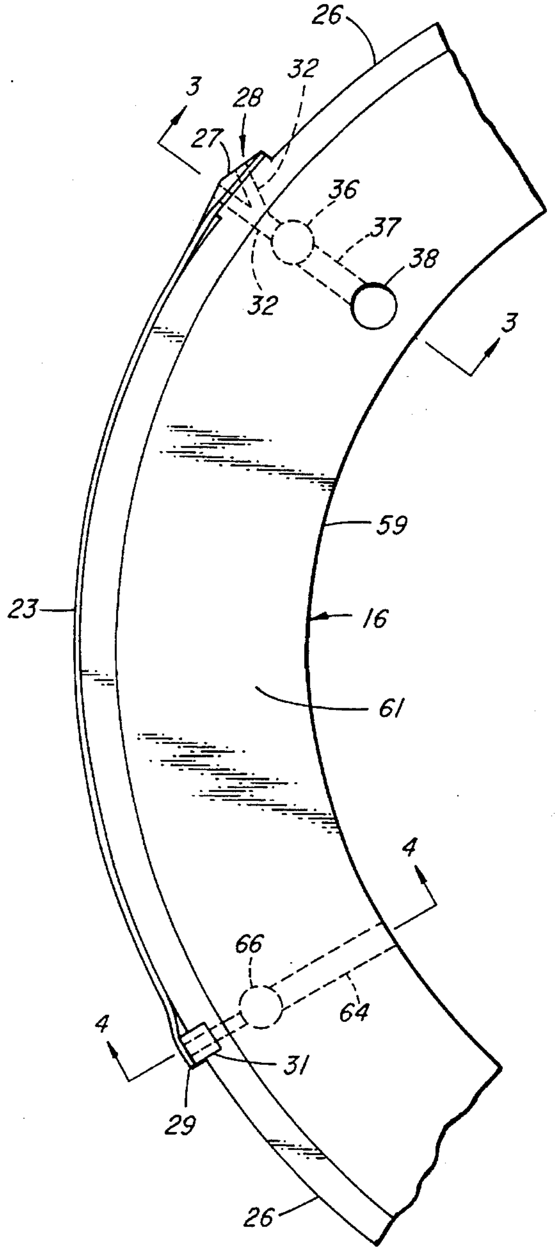
FIG. 2 is a fragmentary top plan view of a vacuum drum, showing leading and trailing end pads and a label thereon.

For simplicity, only leading end vacuum holes 32 are shown in FIG. 2. However, a typical drum 16 will have plural vacuum holes in its periphery between pads 28 and 31, to hold the entire label segment securely in place, with its inner face directed outwardly, during the adhesive application and the container wrap steps. Vacuum holes 32 are in communication with a vertical plenum 36, which, in turn, is connected by plural tubes 37, to a vacuum passageway 38. A vacuum pump and interconnecting lines, well known in the art but not included in the drawings, provide vacuum to passageway 38 to draw leading end 27 securely against the pad 28.

Figure 3:
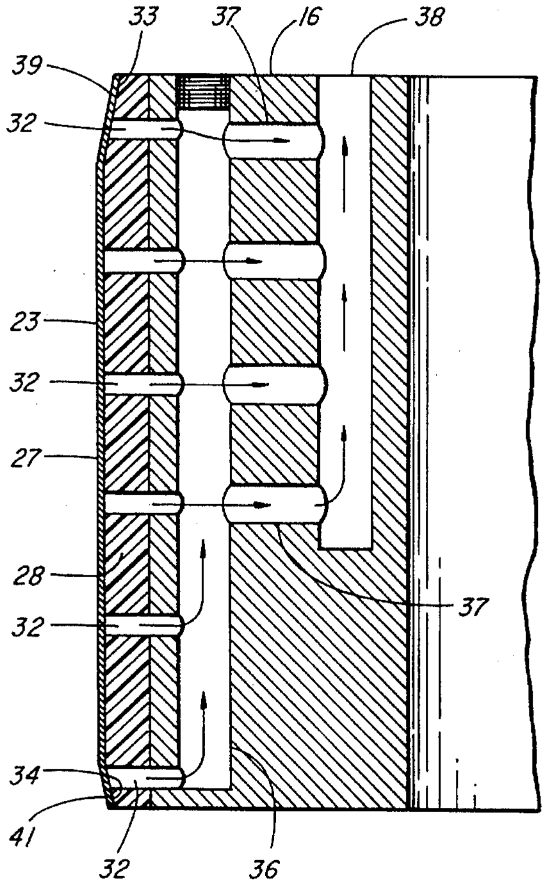
FIG. 3 is an expanded scale, cross-sectional view of the leading end pad and the vacuum drum, taken on the line 3—3, shown in FIG. 2.
Figure 4:
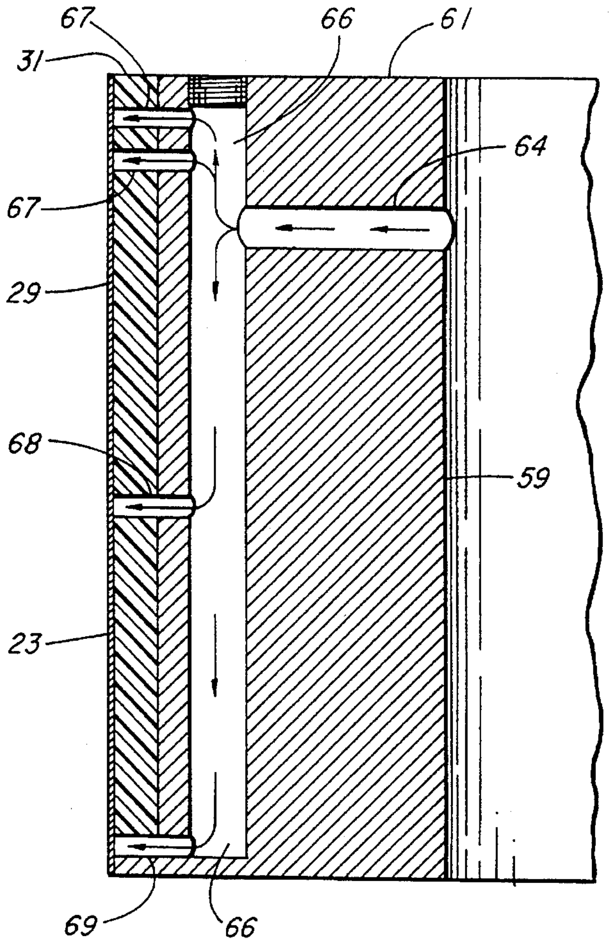
FIG. 4 is an expanded scale, cross-sectional view of the trailing end pad and vacuum drum, taken on the line 4—4, shown in FIG. 2.

As is shown most clearly in FIG. 3, leading end pad 28 also includes upper chamfer 33 and lower chamfer 34. Each chamfer has at least one vacuum hole 32 to ensure that upper edge 39 and lower edge 41 of leading end 27 are drawn inwardly, away from the outwardly exposed surface of the label 23.

Adhesive station 17 includes a rotary wheel 42, for the application of adhesive 40 or glue to selective portions on the inner face or surface of leading and trailing ends of the label. A stationary or movable, wick or foam element may be substituted for the rotary wheel, depending upon the adhesive employed. The adhesive material, by way of example, may be a hot melt adhesive, a cold paste glue, or any other suitable substance for adhering the particular label and container together as contemplated herein. Station 17 also has a well or a tank (not shown) which provides a constant replenishment of the preferred hot melt adhesive 40 to the wheel 42, either by direct immersion of the wheel, or with the assistance of a circulation pump.

Rotary wheel 42 is spaced a predetermined distance from the outer periphery 26 of the vacuum drum so that wheel 42 will only come into contact with and apply adhesive upon, the leading and trailing ends of the label. To minimize tearing and pulling of the label during the application of adhesive 40, wheel 42 is rotated at a speed generally matching that of the vacuum drum, but in a rotational direction opposite thereto (see FIG. 1).

Figure 5:
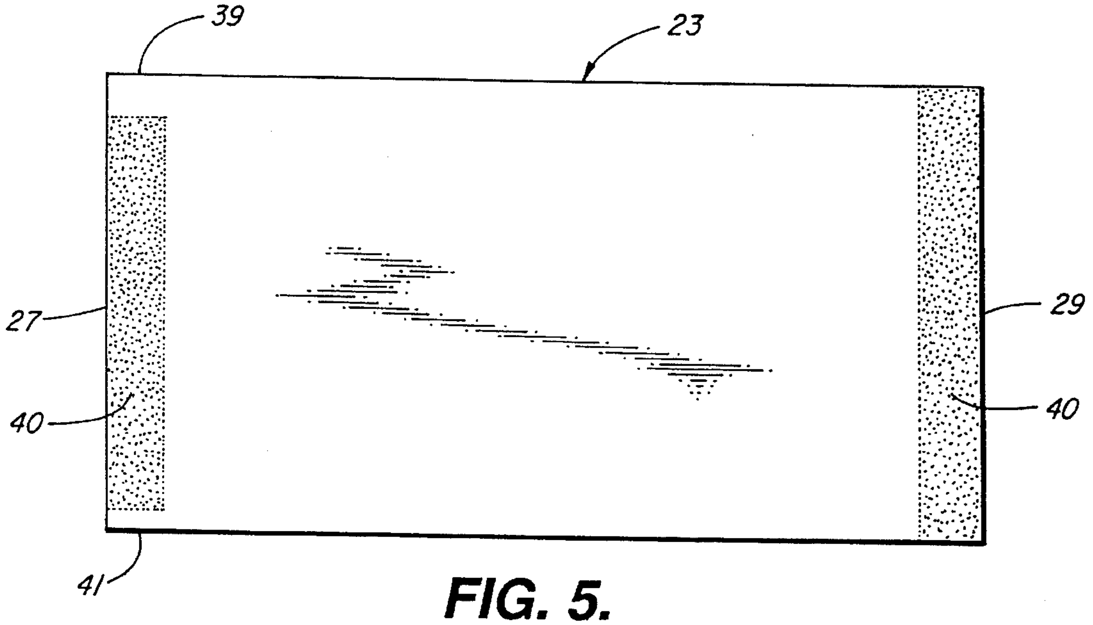
FIG. 5 is a plan view of the reverse, or inner side of a label treated with adhesive, in preparation for application to a container.

Since the upper edge 39 and lower edge 41 of the leading end of the label are withdrawn from the surface of the wheel 42, no adhesive is applied in these immediate areas. On the other hand, adhesive 40 is applied across the full extent of the trailing end 29, as shown in FIG. 5. The importance of this selective application of adhesive will become evident in the discussion below, regarding the label shrinking step.

Other apparatus may be used as well to apply the adhesive or glue to the label. For example, an adhesive wheel or a drum having a gravure surface is capable of print-applying adhesive to selective areas of a label. Also, dots or beads of adhesive may be ejected under pressure through a nozzle or an orifice upon a label. Both the gravure method and the ejection method require synchronization of the action of the adhesive station and the vacuum drum to ensure accurate placement of the adhesive; however, both methods obviate the need for leading and trailing end pads on the surface of the label carrying vacuum drum. It should also be noted that a driven vacuum belt could be adapted and used by one of ordinary skill in the art, to perform the same functions in the same way and provide the identical result as the vacuum drum described herein.

With the label 23 adhesively prepared, the vacuum drum leaves the adhesive station, and with continued rotation, approaches a container 22 being transported within a peripheral pocket of the rotary starwheel 14. Making particular reference to FIG. 8, the container 22 includes a right-circular, cylindrical sidewall section 43, an inwardly directed upper end section 44, and an inwardly directed lower end section 46. For the purposes of practicing the present invention, the container 22 must have at least one inwardly directed, upper or lower end section. The configuration of this end section is a matter of aesthetic and functional design choice, and may be frusto-conical, curvilinear, stepped, or irregular in nature.

When the container and the label physically converge, sidewall 43 is brought into tangential contact with the tacky, hot melt adhesive upon the leading end 27 of the label. As explained in greater detail in the '557 Patent, infeed guide 47 and roll-on pad 48, act together with the star wheel 14 and the vacuum drum 16, to rotate container 22 both before and after contact with the label. A coating 50 or strip of resilient material, such as rubber, lines the inner surface of roll-on pad 48 to ensure positive rotation of the container, and to assist in the formation of a strong adhesive bond between label ends, as discussed below.

Figure 6:
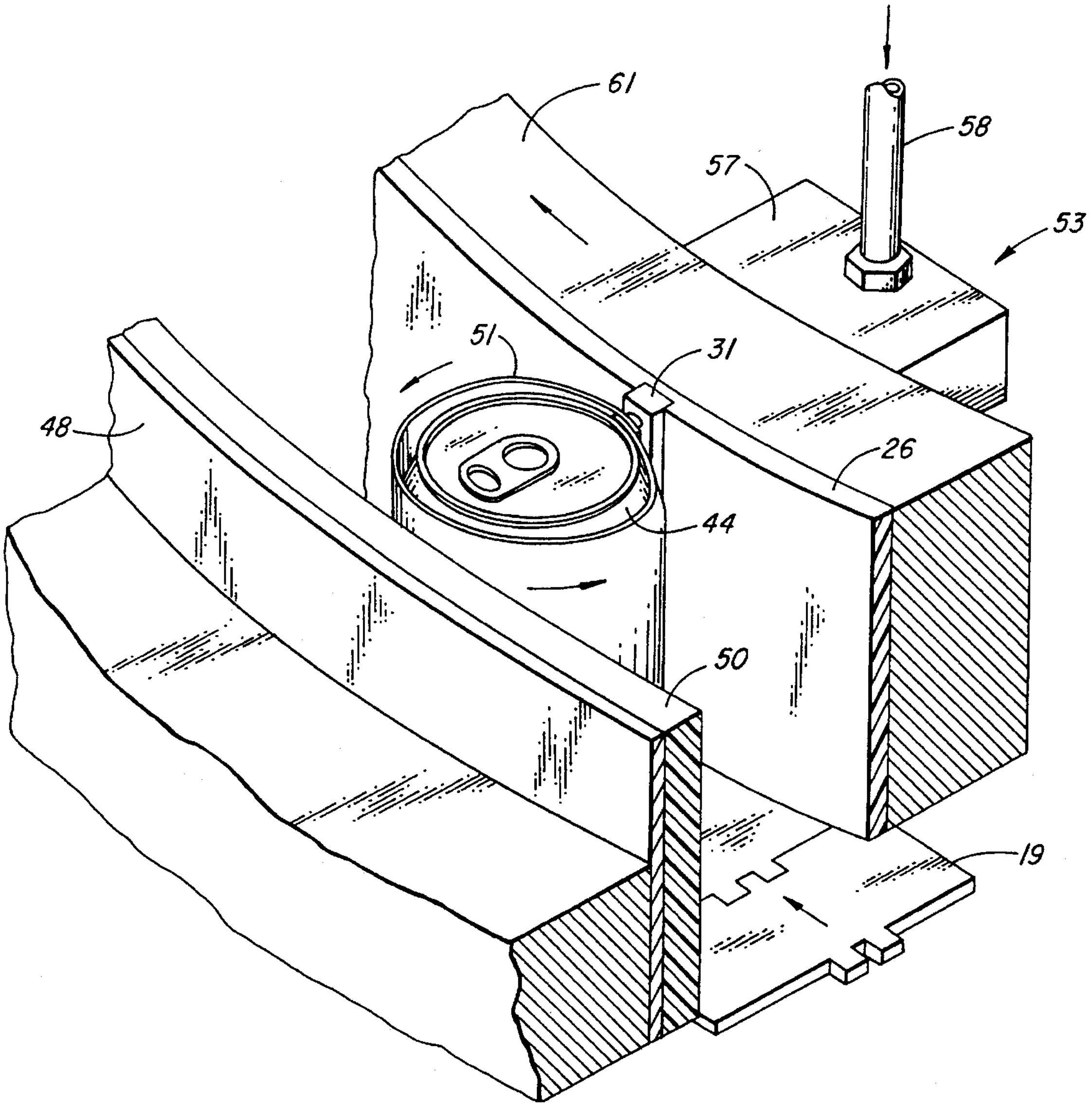
FIG. 6 is a fragmentary, isometric view of portions of the labeling apparatus and a container, at the moment of formation of the first and second seams.
Figure 7:
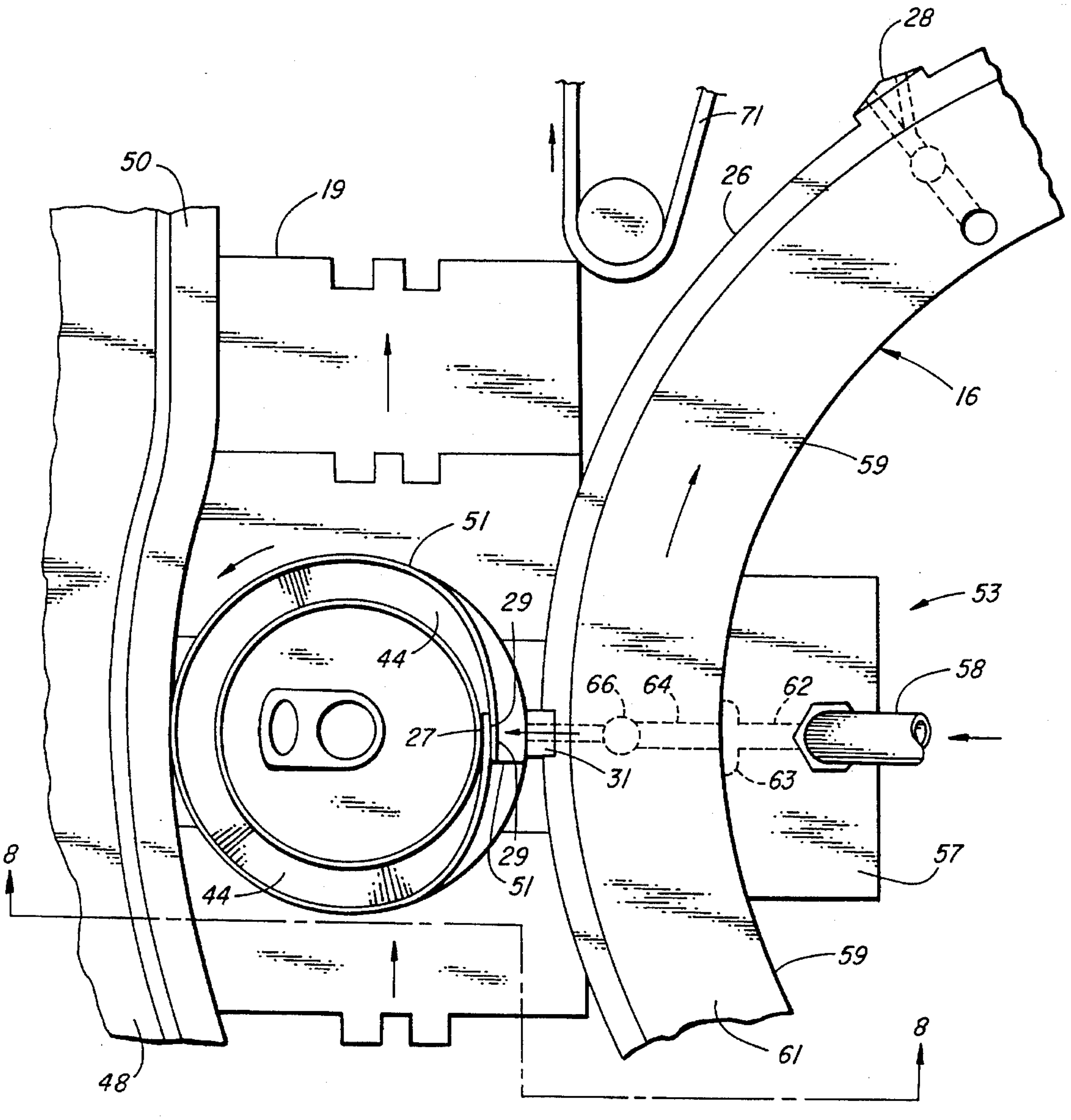
FIG. 7 is a top plan view of portions of the apparatus and a container, in the same operational position as that shown in FIG. 6.
Figure 8:
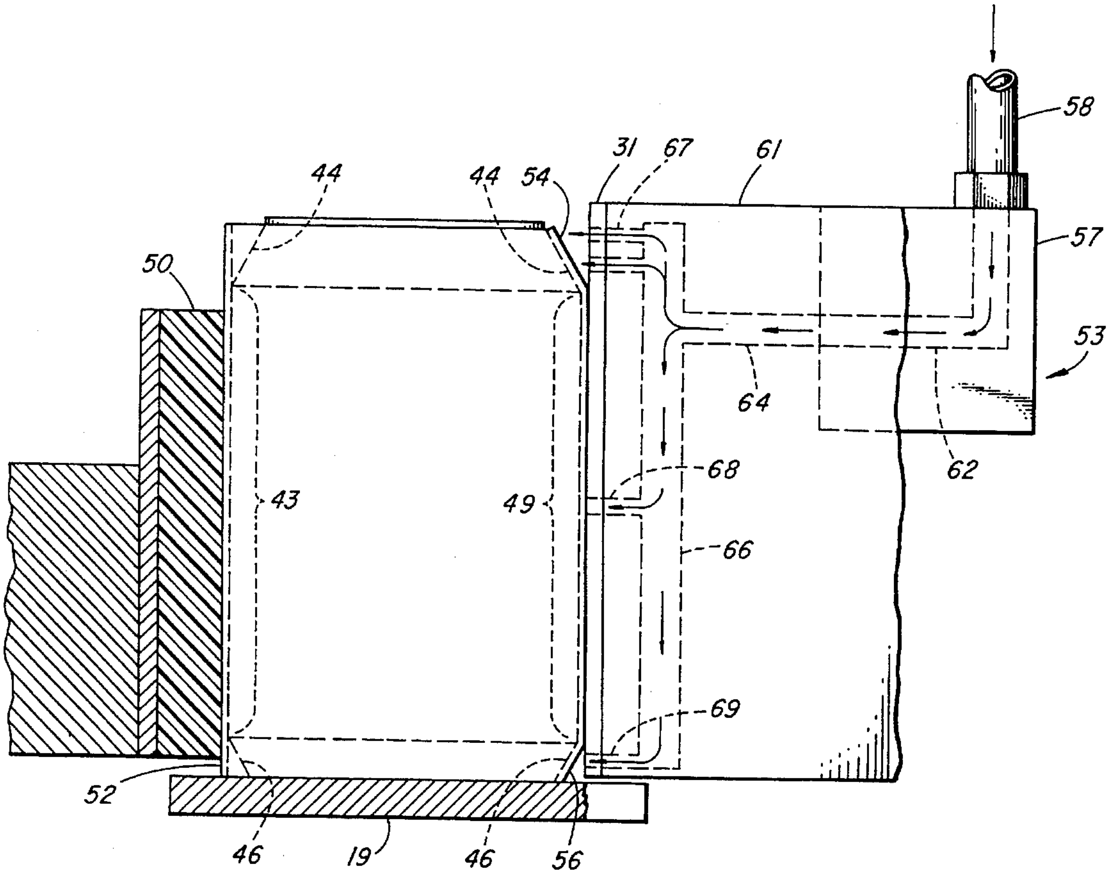
FIG. 8 is an elevational view of portions of the apparatus and a container, taken in the direction indicated by the line 8—8 of FIG. 7.

With continued rotation of the container, the label segment 23 is successively drawn away from the vacuum drum and wrapped completely around the container in this process, trailing end 29 is caused to overlap leading end 27, as shown most clearly in FIGS. 6, 7, and 8. At the initial moment of label end overlap, compressive forces are applied to the portions of the leading .and trailing ends supported by the container sidewall 43. A first compressive seam 49 is thereby formed between overlapping, supported portions, of the leading and trailing label ends.

Extending beyond the sidewall section of the wrapped container are an upper, free-standing label portion 51 and a lower, free-standing label portion 52. Both free-standing label portions have respective, free-standing leading and trailing end portions. While the application herein illustrates both upper and lower free-standing label portions, it may be desirable to use only one or the other of such portions, depending upon the design of the container and the label wrap.

A label deflector, generally designated by the numeral 53, is structurally and functionally integrated with the label-carrying vacuum drum 16, to drive or deflect the free-standing leading and trailing end label portions into respective, compressive contact with upper end section 44 and lower end section 46 of the container 22. By compressing free-standing end portions against the container ends, a second compressive seam, having an upper component 54 and a lower component 56, is formed. As will be noted in FIG. 8, the upper and lower components of the second compressive seam are serially ordered and respectively adjacent the intermediate first seam. Consequently a substantially continuous, vertical seam is formed from the upper edge 39 to the lower edge 41.

Preferably, both components of the second compressive seam are formed simultaneously with the formation of the first compressive seam. This is accomplished by integrating the label deflector 53 with the vacuum drum 16, or any other apparatus that may be employed to wrap the label around the container and form the first compressive seam. The latter described apparatus may include a driven vacuum belt, for bringing a label into contact with a container, and then spinning the container about its axis to complete a full wrap. Apparatus is also well known in the art which rolls a container first past an adhesive applicator, and then over a stationary label, before wrap-applying the label.

In our preferred embodiment, label deflector 53 is particularly adapted for use with the vacuum drum 16. Deflector 53 includes a stationary block 57, having an inlet line 58 connected to an air compressor, or another convenient supply of pressurized air. Block 57 has an arcuate outer face, posited in close relation to a circular inner surface 59 of vacuum drum ring 61. As shown most clearly in FIG. 7, a block passageway 62 interconnects inlet line 58 with a horizontally elongated, discharge recess 63, located in the outer face of block 57. Ring passageway 64 has one end in communication with a vertical manifold 66, which, in turn, supplies pressurized air at the appropriate moment to upper vents 67, a middle vent 68, and a lower vent 69.

Block 57 is located in accordance with a predetermined rotational position of the vacuum drum, so that the discharge recess 63 registers with the other end of passageway 64, at the moment the trailing end 29 overlaps the leading end 27. The elongated, oblong configuration of recess 63 is designed to extend the period of recess-passageway registration. This ensures that the burst of air through the vents is sufficiently long in duration, to form quality compressive seams between the unsupported label ends.

Thus, simultaneously with the formation of the first compressive seam 49, a blast of air is emitted through upper vents 67, deflecting the upper free-standing label portion 51 and compressing the respective free-standing leading and trailing label ends against the upper end section 44 of the container.

Also, pressurized air is emitted through middle vent 68, compressing the adjacent first compressive seam 49 against the sidewall of the container. The vent 68 is not required in all applications, but is considered most useful when empty, aluminum containers, or the like, are being labeled. In the event that the container has a flexible sidewall, vent 68 provides extra assurance that the first seam 49 is well formed by deflecting the seam into compression against the sidewall.

Finally, a jet of air is passed through lower vent 69, deflecting the lower free-standing label portion 52 and compressing the respective free-standing leading and trailing end portions against the lower end section 46 of the container. In this manner, a continuous bond is formed between the label ends, extending in serial fashion from second upper seam component 54, to first compressive seam 49, to second lower seam component 56.

It will be appreciated now why adhesive was not applied .to the upper and lower free-standing portions of the leading end of the label. If adhesive were present in these areas, these portions of the label would be adhered to the container during the formation of the upper and lower seam components. This partial adherence of the label to the container would result in an irregular and convoluted appearance of the label, when subjected to heat for shrinking, as described below.

It has been determined that trailing end pad 31 is most advantageously provided with straight sidewalls 55, to practice the invention herein. Making particular reference to FIG. 10, it will be noted that pad 31 is a separate strip of resilient material, mounted within a cutout 60 in the outer periphery 26, so that the parallel sidewalls 55 are substantially normal to periphery 26. Such a configuration ensures that any lateral flow of air along the periphery 26, is slowed down by turbulence and eddy flows, indicated by the corkscrew air flow patterns in FIG. 10.

Figure 9:
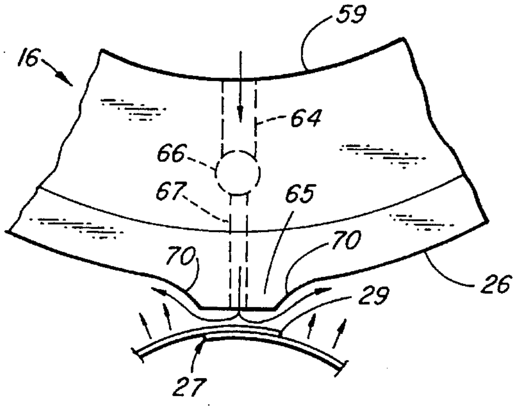
FIG. 9 is a simplified representation of a typical prior art trailing end pad configuration, displaying an undesirable laminar air flow.
Figure 10:
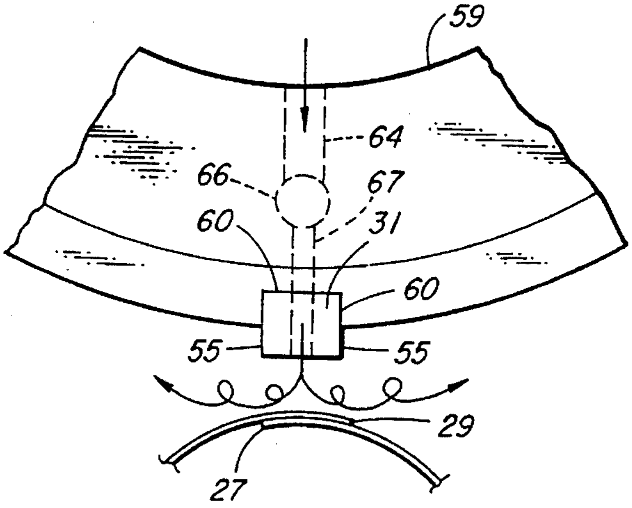
FIG. 10 is a simplified representation of a trailing end pad configuration of the present design, particularly adapted to inhibit the formation of a laminar air flow; and, FIG. 11 is a front elevational view of a labeled container, after the unsupported label portions have been heat shrunk onto the container.

A typical prior art trailing end pad 65, shown in FIG. 9, is integral with periphery 26, representing a raised area remaining after adjacent regions are ground away during manufacture of the vacuum drum. It is evident that such a method of manufacture leaves pad 65 with inwardly curving sidewalls 70. Unfortunately, the arcuate surface of the sidewalls 70 produces a Bernoulli effect, when the laminar air flow passes by. The accelerated air flow produces a partial vacuum along the periphery, tending to draw the label ends back against the periphery, instead of deflecting the label against the container end. As a consequence, the trailing end pad 31 of FIG. 10 is the preferred design for forming strong and reliable overlap seams.

While our preferred embodiment uses purely pneumatic force to deflect the unsupported label portions, mechanical means may also be employed to perform the same function. For example, a mechanical foot, connected by a rod to a pneumatic or a hydraulic ram, a mechanical cam, or an electric solenoid, could be used in lieu of the purely pneumatic system described herein. The actuating mechanism may be mounted directly on the vacuum drum, and actuated in synchronism with the predetermined rotational position of the vacuum drum discussed above. It is also contemplated that electromagnetic or electrostatic means may readily be adapted to provide an adequate amount of label deflecting force to practice the invention, as well.

After the first and second label seams are formed, continued rotation of the vacuum drum passes the container farther downstream along the conveyor 19, until a driven belt 71 and a secondary roll on pad 72 are encountered. The labeled container is then rotated while the first label seam is additionally compressed between the belt and the opposing pad. This further compression of the label seam ensures that the adhesive bond is securely formed, prior to label heating.

The container 22 is finally transported to the heat shrink oven 21, where heat is applied at least to the free-standing portions of the label. Oven 21 may include appropriate ducting or deflecting structures for selectively directing heat, only to the free-standing portions of the label. Or, for certain applications, it may be desirable simply to provide an overall application of heat to the label. In either event, the heated portion of the label 23 shrinks inwardly upon the container, so that adjacent upper end section 44 and lower end section 46 are covered by respective free-standing label portions.

Figure 11:
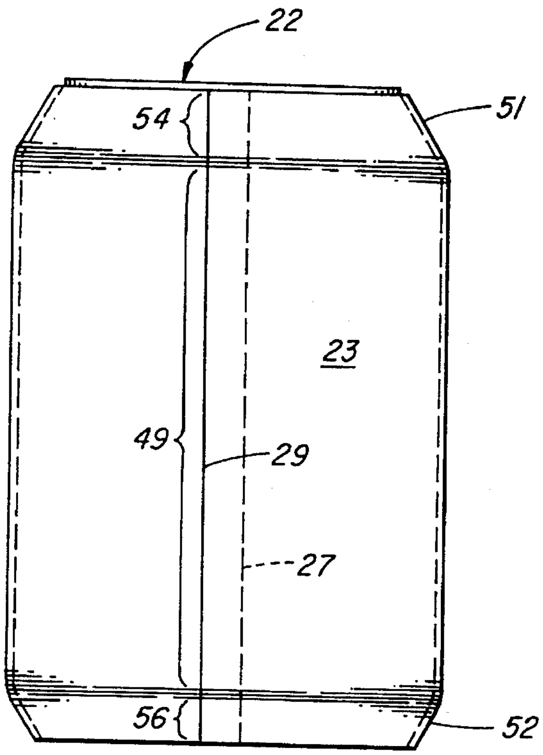

FIG. 11 shows the appearance of the fully wrap-shrunk label upon container 22, after exit from the oven 21. The upper component 54 and lower component 56 of the second compressive seam extend from both ends of the first compressive seam 49. And, upper free-standing portion 51 and lower free-standing portion 52 are tightly shrunk about the container to provide an effective and aesthetically pleasing label wrap.

What is claimed is:

1. An apparatus for applying a heat shrinkable film to a container having a right-circular, cylindrical sidewall section, and at least one inwardly directed end section, comprising:

a. first means for applying an adhesive to an inner face of a leading end of the film;

b. second means for applying an adhesive to the inner face of a trailing end of the film;

c. means for bringing the sidewall section of the container into contact with said adhesively treated leading end;

d. means for wrapping the film around the container with said adhesively treated trailing end overlapping said leading end, forming a first compressive seam between portions of leading and trailing ends supported by the sidewall section of the container, and leaving an unsupported, free standing portion of the film and said ends, extending beyond said sidewall section;

e. label deflector means for forming a second compressive seam between said free standing portions of said leading and trailing ends, by bringing only said ends into compressive contact with the inwardly directed end section of the container; and, f. means for applying heat at least to said free standing portion of the film, shrinking said portion around the inwardly directed end section of the container.

2. An apparatus as in claim 1 in which said first means for applying adhesive treats only said supported portion of said leading end with adhesive.

3. An apparatus as in claim 1 in which said first means for applying adhesive includes: a rotary vacuum drum having an outer periphery for transporting the film; and, a rotary adhesive wheel adjacent said periphery of said drum, adapted to make selective contact with said leading and trailing ends of the film as it passes by said wheel.

4. An apparatus as in claim 3 in which said vacuum drum includes radially extending pads on said periphery under said leading and trailing ends, and in which said adhesive wheel is spaced a predetermined distance from said vacuum drum and counter-rotated therewith, so that said wheel applies adhesive only to said leading and trailing ends of the film.

5. An apparatus as in claim 4, in which said trailing end pad includes parallel sidewalls, radially extending from said vacuum drum and substantially normal to said periphery.

6. An apparatus as in claim 1 in which said adhesive is hot melt adhesive.

7. An apparatus as in claim 1 in which said wrapping means comprises: a rotary vacuum drum having an outer periphery for transporting the adhesively treated film, and a curved roll-on pad, spaced from and concentric with said vacuum drum, said pad cooperating with said vacuum drum to rotate the delivered container, wrapping the adhesively attached film around the container and compressing the trailing end of the film over the leading end.

8. An apparatus as in claim 1 in which said label deflector means comprises a jet of air directed inwardly against said free standing portion of said trailing and leading ends, concurrent with the formation of said first compressive seal.

9. An apparatus as in claim 8 including a rotary vacuum drum having a ring with an outer periphery for transporting the film, said ring including at least one ring passageway extending radially therethrough, said ring passageway having one end in communication with a discharge vent on said periphery beneath said free standing portion of said trailing end, and further including means for supplying pressurized air to the other end of said ring passageway for the discharge of air through said vent.

10. An apparatus as in claim 9 in which said other end of said ring passageway terminates at a circular inner surface of said vacuum drum, and further including a stationary block having an arcuate outer face surface positioned in close relation to said inner surface of said ring, said block further including a block passageway having an inlet connected to a supply of pressurized air and a discharge recess in said outer surface, said block being positioned so that a jet of air discharges through said vent when said first seam is formed.

11. A method for applying a heat shrinkable film to a container having a right-circular, cylindrical sidewall section, and at least one inwardly directed end section, comprising the steps of:

a. applying an adhesive to an inner face of a leading end of the film;

b. applying an adhesive to the inner face of a trailing end of the film;

c. bringing the sidewall portion of the container into contact with said adhesively treated leading end;

d. wrapping the film around the container with said adhesively treated trailing end over-lapping said leading end, forming a first compressive seam between portions of leading end trailing ends supported by the sidewall portion of the container, and leaving an unsupported, free standing portion of the film and said ends, extending beyond said sidewall section;

e. forming a second compressive seam between said free standing end portions by deflecting only said end portions into compressive contact with the inwardly directed end section of the container; and, f. heating at least said free standing portion of the film, shrinking the film around the inwardly directed section of the container.

12. A method as in claim 11 in which the adhesive is applied only to the supported portion of the end of the film.

13. A method as in claim 11 in which the adhesive is hot melt adhesive.

* * * * *